United States Patent
Hayashi et al.

(10) Patent No.: US 6,897,769 B2
(45) Date of Patent: May 24, 2005

(54) TIRE PRESSURE MONITORING SYSTEM AND METHOD FOR REGISTERING IDENTIFICATION CODE IN THE SAME

(75) Inventors: Hiromasa Hayashi, Obu (JP); Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 81 days.

(21) Appl. No.: 10/656,878

(22) Filed: Sep. 8, 2003

(65) Prior Publication Data

US 2004/0090324 A1 May 13, 2004

(30) Foreign Application Priority Data

Sep. 12, 2002 (JP) ........................................ 2002-267368

(51) Int. Cl.[7] .......................... B60C 23/00; B60C 23/02
(52) U.S. Cl. ........................ 340/442; 340/445; 340/447
(58) Field of Search ................................ 340/442, 443, 340/444, 445, 447; 73/146.5, 146.2

(56) References Cited

U.S. PATENT DOCUMENTS

| | | | |
|---|---|---|---|
| 5,602,524 A | | 2/1997 | Mock et al. |
| 6,204,758 B1 | * | 3/2001 | Wacker et al. .............. 340/444 |
| 6,292,096 B1 | * | 9/2001 | Munch et al. .............. 340/445 |
| 6,407,662 B1 | * | 6/2002 | Gomez De Sebastian .. 340/447 |
| 6,417,766 B1 | * | 7/2002 | Starkey ...................... 340/447 |
| 6,441,727 B1 | * | 8/2002 | LeMense .................... 340/442 |

* cited by examiner

Primary Examiner—John Tweel, Jr.
(74) Attorney, Agent, or Firm—Posz Law Group, PLC

(57) ABSTRACT

A tire pressure monitoring ECU receives inputs indicative of identification (ID) codes, each of which is uniquely assigned to each sensor unit provided to each tire of a vehicle, via a bar code reader. It stores the ID codes and compares it with ID codes contained in signals from the sensor units, respectively. When the result of the comparison satisfies a predetermined condition, the stored ID code is registered as an ID code corresponding to the uniquely assigned ID code of the sensor unit.

10 Claims, 3 Drawing Sheets

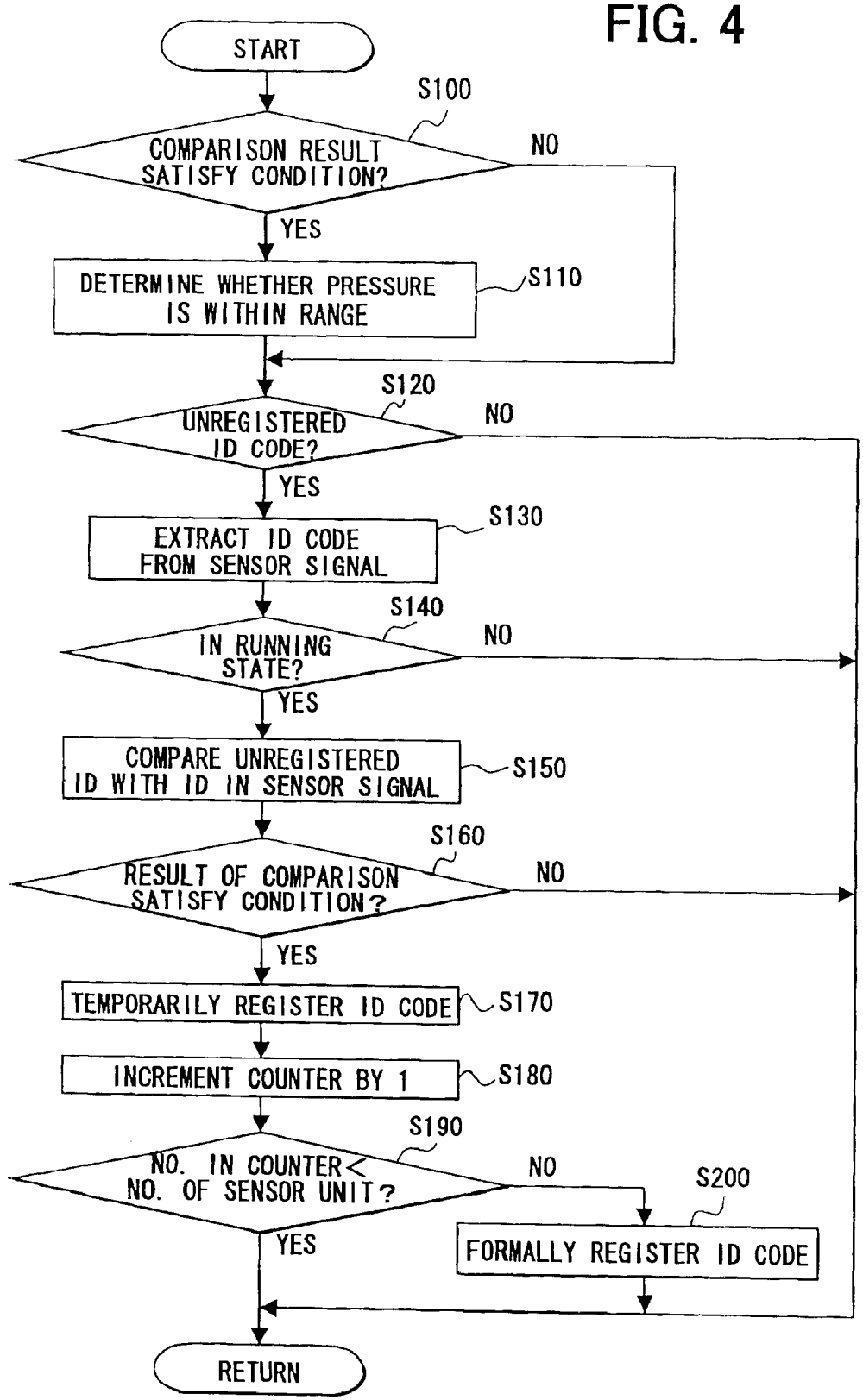

TIRE PRESSURE MONITORING SYSTEM AND METHOD FOR REGISTERING IDENTIFICATION CODE IN THE SAME

CROSS REFERENCE TO RELATED APPLICATION

This application is based on and incorporates herein by reference Japanese Patent Application No. 2002-267368 filed on Sep. 12, 2002.

FIELD OF THE INVENTION

The present invention relates to a tire pressure monitoring system and a method for registering an identification (ID) code uniquely assigned to a sensor unit included in the monitoring system.

BACKGROUND OF THE INVENTION

A various type of tire pressure monitoring systems has been proposed. One example of the kind is shown in U.S. Pat. No. 5,602,524. The tire pressure monitoring system includes sensor units and a monitoring unit. Each sensor unit is constructed of a sensor for sensing a tire pressure and a transmitter for sending a signal indicative of a sensed tire pressure, and mounted to a tire. The monitoring unit, which is mounted in a vehicle, receives the signal from the sensor unit and issues a warning when the tire pressure is equal to or lower than a predetermined level.

In this system, an identification (ID) code is uniquely assigned to each sensor unit for determining whether the received signal is sent from the sensor unit. The ID code is sent to the monitoring unit with the sensed tire pressure. The monitoring unit stores the ID code of each sensor unit registered in advance. It determines whether the sensed tire pressure is within a proper range only when the ID code contained in the signal matches the stored ID code. By using the ID code, the reliability of the tire pressure monitoring is improved. For example, improper tire pressure monitoring performed based on signals from sensor units mounted to tires of other vehicle is less likely to occur.

When the ID code is registered to the monitoring unit, the mode of the monitoring unit is switched from a monitoring mode (regular mode) to a register mode by a predetermined switching operation. Then, the tire pressure is rapidly reduced so that the signal containing the ID code is forcefully sent from the sensor unit. The ID code is registered to the monitoring unit when it is in the register mode and has received the signal from the sensor unit.

To register the ID code, a switch for switching the mode of the monitoring unit to the register mode is required. When switching to the register mode or returning to the regular mode is not properly performed, the ID code may not be properly registered in the monitoring unit. As a result, the tire pressure monitoring process may not be properly performed.

SUMMARY OF THE INVENTION

The present invention therefore has an objective to provide a tire pressure monitoring system that does not require mode switching for registering an ID code of a sensor unit in a monitoring unit. The present invention has another objective to provide a method for registering the ID code in the monitoring unit.

A tire pressure monitoring system of the present invention includes sensor units and a monitoring unit that has a register means. The sensor units are mounted to respective tires for sensing tire pressures. They send signals containing ID codes, each of which is uniquely assigned to each sensor unit, and the sensed tire pressures to the monitoring unit.

The monitoring unit receives the signals from the sensor units and monitors tire pressures based on the ID codes and the sensed tire pressures. The monitoring unit receives and stores inputs of ID codes, each of which is uniquely assigned to each sensor unit, inputted via an external device. The monitoring unit compares one of the ID codes in the sensor signals with the corresponding stored ID signals. When they match, the register means registers the stored ID codes as an ID code corresponding to the uniquely assigned identification code or the sensor unit.

BRIEF DESCRIPTION OF THE DRAWINGS

The above and other objectives, features and advantages of the present invention will become more apparent from the following detailed description made with reference to the accompanying drawings. In the drawings:

FIG. 4 is a flowchart of an air pressure monitoring process included in the control process.

DETAILED DESCRIPTION OF THE PREFERRED EMBODIMENT

Figure 1:
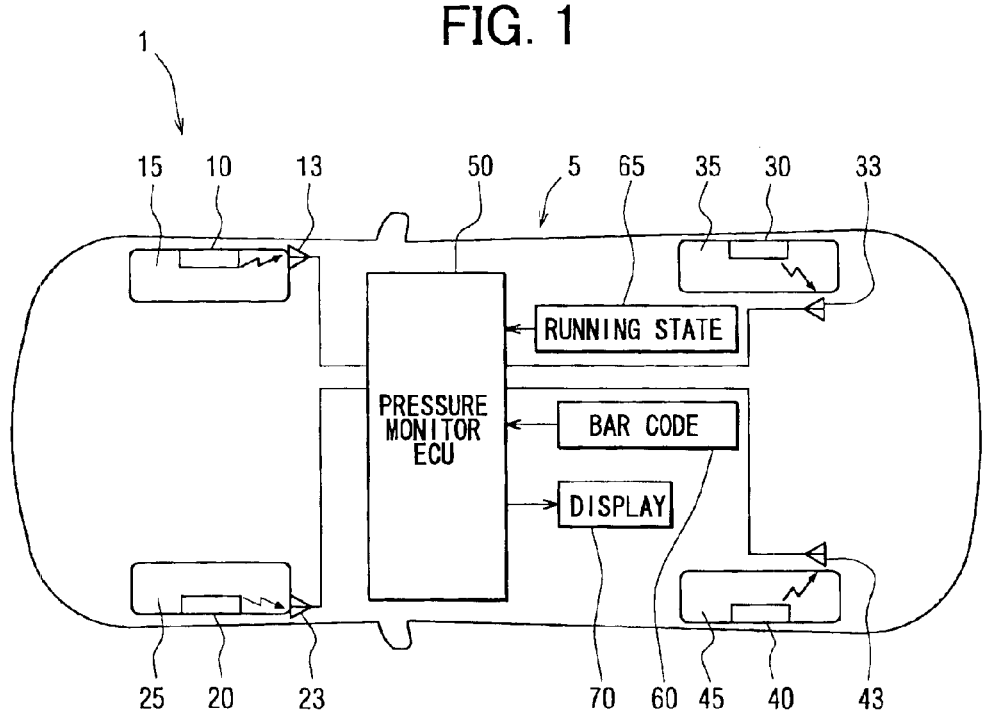
FIG. 1 is a schematic view of a tire pressure monitoring system according to the first embodiment of the present invention.

The preferred embodiment of the present invention will be explained with reference to the accompanying drawings. In the drawings, the same numerals are used for the same components and devices.

Referring to FIG. 1, a tire pressure monitoring system 1 includes sensor units 10, 20, 30, 40, air pressure sensors 11, 21, 31, 41, transmitters 12, 22, 32, 42, and a monitoring unit 5. The air pressure sensors 11, 21, 31, 41 detect air pressures of tires. The transmitters 12, 22, 32, 42 send radio signals indicative of sensed air pressures and identification (ID) codes uniquely assigned to the sensors 11, 21, 31, 41. The radio signals may be radio frequency (RF) signals.

Each sensor unit 10, 20, 30, 40 is constructed of one pressure sensor 11, 21, 31, 41, and one transmitter 12, 22, 32, 42. The sensor units are mounted to tires 15, 25, 35, 45, respectively, for example, mounted to disk wheels of the tires 15, 25, 35, 45 after integrally configured to tire valves. Temperature sensors may be used instead of the pressure sensors 11, 21, 31, 41. In this case, tire pressure variations due to temperature variation can be taken into consideration when the tire pressures are determined.

Figure 2:
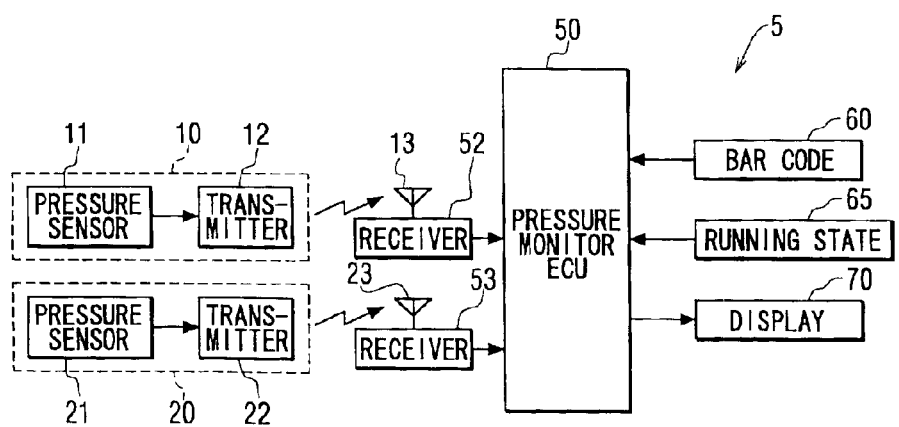
FIG. 2 is a block diagram of the tire pressure monitoring system.

The monitoring unit 5 receives signals from the sensor units 10, 20, 30, 40 and monitors the tire pressures of the tires 15, 25, 35, 45 based on the sensed air pressures included in the sensor signals. Referring to FIG. 2, the monitoring unit 5 includes receiving antennas 13, 23, 33, 43, receivers 52, 53, an air pressure monitoring ECU 50, a running state sensor 65, and a display 70.

The antennas 13, 23, 33, 43 are mounted to a wheel housing of each tire 15, 25, 35, 45 for receiving the signals from the transmitter 12, 22, 32, 42. The signals received by the antennas 13, 23, 33, 43 are inputted to respective receivers 52, 53 for processes including amplification and demodulation. Then, the signals are sent to the pressure monitoring ECU 50 and the tire pressures are determined based on the sensed pressures included in the signals. The sensor units 10, 20, 30, 40 may share a single receiving antenna and a receiver.

The result of the tire pressure determination is displayed on the display 70 arranged in an instrumental panel in the vehicle. The display 70 includes a warning lamp that is lit when the tire pressures are determined abnormal for notifying a driver of an abnormal tire pressure.

The running state sensor 65 detects a running state of the vehicle, which is whether the vehicle is running, and inputs the detected state to the pressure monitoring ECU 50. More specifically, any one of speed sensor and tire temperature sensor is used for detecting the running state by a vehicle speed or a tire temperature of the vehicle. The pressure monitoring ECU 50 determines whether the vehicle is running based on the detected state.

Furthermore, the pressure monitoring ECU 50 has an external input terminal to which a bar code reader 60 is connectable. The bar code reader 60 is an external device used for reading bar codes corresponding to the ID codes of the sensor units 10, 20, 30, 40 when connected to the pressure monitoring ECU 50. Signals indicative of the bar codes are inputted to the pressure monitoring ECU 50. Inputting the ID codes via the bar code reader 60 reduces input errors compared to inputting them from a keyboard. The bar cord reader may be configured to transmit signals via radio. The external device for inputting ID codes may be a computer or a personal digital assistant (PDA) connectable to the pressure monitor ECU 50 via wire or radio.

Figure 3:
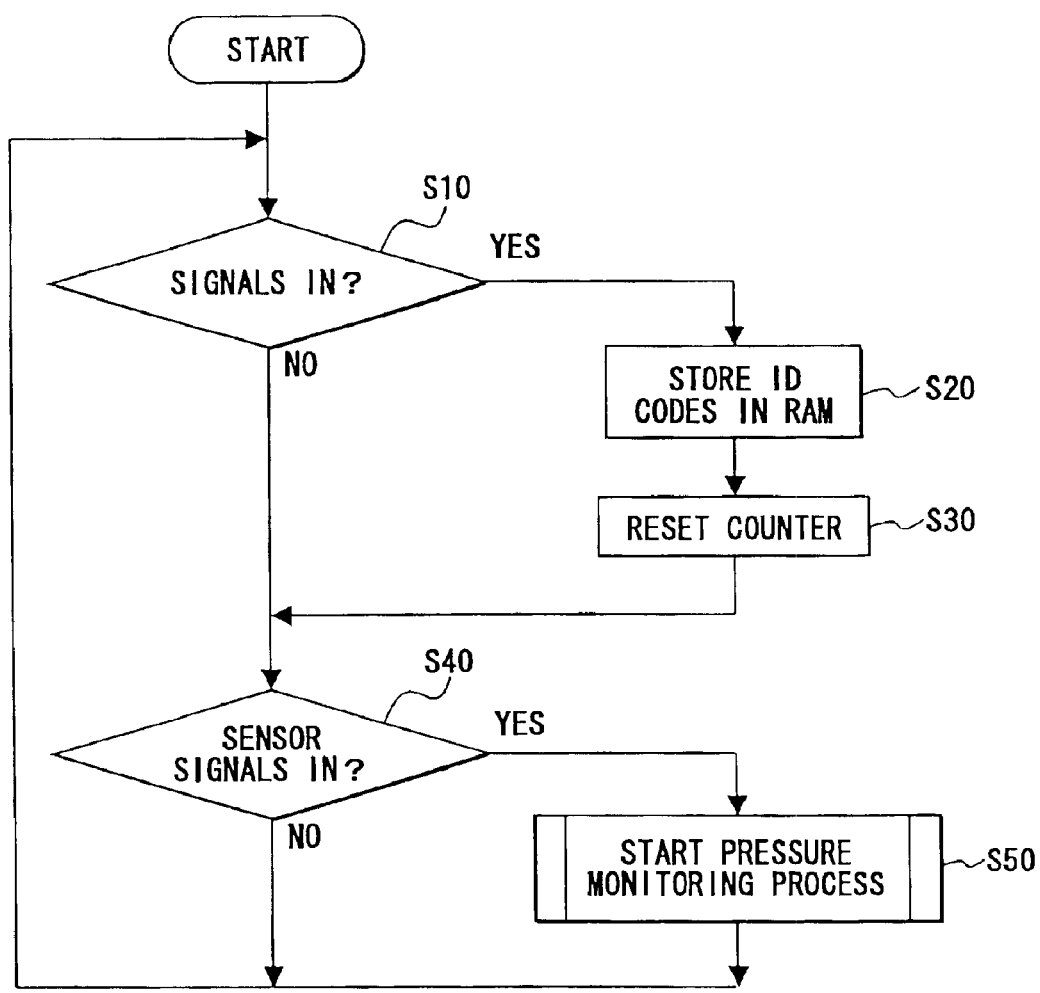
FIG. 3 is a flowchart of a control process performed by the monitoring unit included in the monitoring system.

The monitoring unit 5 performs a control process as shown in FIGS. 3 and 4. It is determined whether signals indicative of the ID codes are inputted from the bar code reader 60 to the pressure monitoring ECU 50 (S10). When the signals are inputted, they are stored in a RAM included in the pressure monitoring ECU 50 (S20). Then, a comparison counter is reset (S30). The comparison counter is provided for counting the number of comparisons that have been made. The comparisons will be explained in detail later.

The ID codes inputted from the bar code reader 60 are compared with the ID codes included in the signals from the sensor units 10, 20, 30, 40. The ID codes are registered to the pressure monitoring ECU only when the results of the comparisons satisfy predetermined conditions. Therefore, improper registrations of the ID codes are less likely to occur even when bar codes corresponding to ID codes of other sensor units are inputted.

It is determined whether any signals are inputted from the sensor units 10, 20, 30, 40 (S40). The sensor units 10, 20, 30, 40 receive power from batteries for sensing the tire pressures and sending signals, they intermittently send signals to reduce power consumption. To reduce interferences among the sensor units 10, 20, 30, 40, the signal intervals are randomly varied.

The sensor units 10, 20, 30, 40 immediately send the signals indicative of the sensed tire pressure to the monitoring unit 5 when abnormal tire pressures are detected by the pressure sensors 11, 21, 31, 41. In other words, the sensor units 10, 20, 30, 40 irregularly send signals to the monitoring unit 5. Therefore, the monitoring unit 5 takes a receipt of the signals from the sensor unit 10, 20, 30, 40 as a trigger for starting a tire pressure monitoring process (S50).

The pressure monitoring process will be explained in detail referring to FIG. 4. The ID code contained in one of the sensor signals is compared with the corresponding ID code temporarily or formally registered in the pressure monitoring ECU 50. It is determined whether the result of the comparison satisfies a predetermined condition (S100). If the result satisfies the condition, it is determined the sensor signal is sent from the sensor mounted to the tires 15, 25, 35, 45. Then, it is determined whether the sensed pressure is within a proper range (S110).

The ID codes uniquely assigned to respective sensor units are compared with the ID codes registered in the pressure monitoring ECU 50. As a result, it is verified that the sensor signals are sent from the sensor units 10, 20, 30, 40 mounted to the tires 15, 25, 35, 45. This reduces improper tire pressure determinations that are made when signals are received from sensor units mounted to other vehicles. Therefore, the reliability of the tire pressure monitoring is improved.

If the sensed pressure is lower than a predetermined level, that is, the tire pressure is abnormal, an indicator 70 is lit for notifying the driver of the abnormal tire pressure. Therefore, the driver perceives the tire pressure is under abnormal conditions.

The comparison is not performed if the inputted ID code is not registered in the pressure monitoring ECU 50, such as immediately after the ID code is inputted to the pressure monitoring ECU 50. In such a case, the pressure determination is not performed and the ID code registration process (S120–S190) is performed.

In the ID code registration process, it is determined whether an ID code that had been inputted via the bar code reader 60 but not temporarily registered exist (S120). More specifically, it is determined whether any ID codes that have not been temporarily registered remain in the RAM. A storage area is set in the RAM for storing the temporary registered ID code separately from a storage area for the ID code in the sensor signal. During the temporary registration of the ID codes, the ID code can be moved to the temporary registered ID code storage area. Moreover, the ID code that has not been temporarily registered and the temporary registered ID code is distinguished from each other by storing the ID codes in the RAM into an EEPROM.

If it is determined that an unregistered ID code exists, the ID code is extracted from the sensor signal (RF signal) (S130). Then, the current running state of the vehicle is determined based on a signal from the running state sensor 65 (S140). If the vehicle is running, the sensor signals from other sensor units are less likely to be inputted by mistake. Therefore, the sensor signals inputted while the vehicle is running can be considered as signals from the sensor units 10, 20, 30, 40 mounted to the tires 15, 25, 35, 45 of the vehicle. This is why the current running state of the vehicle is determined in prior to the comparison between the ID code in the sensor signal and the inputted ID code.

When a speed sensor is used for a running state sensor, it is determined whether a vehicle speed detected by the speed sensor is higher than a predetermined speed. When a tire temperature sensor is used for a running state sensor, it is determined whether a tire temperature is higher than a predetermined temperature. While the vehicle is running, the tire temperatures increase due to the friction between a tire and a road surface. Therefore, the running state can be determined based on the tire temperature. Both speed and temperature sensors may be used for determining the current running state of the vehicle.

When the vehicle is not in a running state, the process expressed in the flowchart shown in FIG. 4 is terminated. When the vehicle is in a running state, the unregistered ID code inputted via the bar code reader 60 is compared with the ID code in the sensor signals (S150). Then, it is determined whether the result of the comparison satisfies the predetermined condition (S160). If the result does not satisfy the predetermined condition, the process expressed in the flowchart shown in FIG. 4 is terminated.

If the result satisfies the predetermined condition, the ID code is temporarily registered into the pressure monitoring ECU 50 (S170). Then, the comparison counter is incremented by 1 (S180). After the ID codes are temporarily registered in the pressure monitoring ECU 50, the ID codes are used for the comparison with the ID codes in the sensor signals performed in step S100. Then, the tire pressures can be monitored based on the ID codes corresponding to the signals from the sensor units 10, 20, 30, 40.

The number counted by the comparison counter is compared with the number of the sensor units 10, 20, 30, 40 mounted to the tires 15, 25, 35, 45 (S190). In this comparison, if the numbers are equal, the temporarily registered ID codes are stored in the EEPROM as formally registered ID codes (S200). Then, the ID code registration process is completed.

If the number of the comparison counter is smaller than the number of the sensor units 10, 20, 30, 40, the process is temporality terminated. The ID code registration process in steps S120 to S190 is preformed when the sensor signals are inputted from the sensor units 10, 20, 30, 40.

The inputted ID codes that have been compared with the ID codes in the sensor signals are set as temporarily registered ID codes. The sensor units 10, 20, 30, 40 having the temporarily registered ID codes are considered as the ones that are mounted to the tires 15, 25, 35, 45. Therefore, it is determined whether the tire pressures are within the proper range signals are inputted from these sensors 10, 20, 30, 40, using the temporarily registered ID codes.

If the ID code registration process has not been completed for all sensor units 10, 20, 30, 40, the tire pressure cannot be determined for all tires 15, 25, 35, 45. In such a case, it is preferable to notify the driver of the conditions that the tire pressure determination cannot be performed. Furthermore, it is preferable to notify the driver abnormal conditions if a predetermined time has passed after the ID codes are inputted via the bar code reader 60. The ID codes of the sensor units 10, 20, 30, 40 are formally registered after all ID codes are temporarily registered. In other words, the notification to the driver may be necessary if the ID codes are formally registered. This makes the determination of whether the notification is necessary easy.

The ID code registration process is included in the pressure monitoring process. As a result, the mode switching is not required when registering the ID codes in the pressure monitoring ECU 50, which is required in the related art.

The present invention should not be limited to the embodiment previously discussed and shown in the figures, but may be implemented in various ways without departing from the spirit of the invention. For example, a sensor unit may be mounted to a spare tire.

What is claimed is:

1. A tire pressure monitoring system comprising:
    a plurality of sensor units, each of which senses a tire pressure of each tire and sends a signal indicative of the sensed tire pressure and an identification code uniquely assigned to each sensor unit; and
    a monitoring unit that receives the signal from the sensor unit and monitors the tire pressure based on the identification code contained in the signal and the sensed tire pressure, wherein
    the monitoring unit has a register means for registering the stored identification code as an identification code of the sensor unit,
    the register means receives a signal indicative of an identification code via an external device, stores the identification code, compares the identification code contained in the signal from the sensor unit with the stored identification code, and registers the stored identification code as an identification code of the sensor unit.

2. The tire pressure monitoring system according to claim 1, wherein the register means compares the IDENTIFICATION code contained in the signal with the stored IDENTIFICATION code under a condition that a vehicle in which the tire pressure monitoring system is installed is traveling.

3. The tire pressure monitoring system according to claim 2, further comprising a running state detecting means for detecting a running state of the vehicle, wherein the register means determines whether the vehicle is in the running state based on a signal received from the running state detecting means.

4. The tire pressure monitoring system according to claim 3, wherein the running state detecting means is a speed sensing means for sensing a speed of the vehicle.

5. The tire pressure monitoring system according to claim 3, wherein the running state detecting means is a temperature sensing means for sensing a temperature of the tire.

6. The tire pressure monitoring system according to claim 1, wherein:
    the external device is a bar code reader; and
    the signal received by the register means contains the identification code expressed in bar code.

7. The tire pressure monitoring system according to claim 1, wherein:
    the register means temporarily registers the identification code received via the external device as a temporarily registered identification code assigned to the sensor unit; and
    the register means formally registers the temporarily registered identification code as a formally registered identification code when the temporary registration of the identification code is completed for all sensor units.

8. A method for registering an identification code uniquely assigned to each sensor unit in a tire pressure monitoring system for a vehicle including a plurality of sensor units for sensing a sensor signal containing the sensed tire pressure and the identification code, and a monitoring unit for monitoring a tire pressure of each tire based on the identification code and the sensed tire pressure contained in the sensor signal, including:
    inputting respective identification codes of the sensor units to the monitoring unit;
    comparing the identification code contained in the sensor with one of the inputted identification codes;
    determining whether a result of the comparison satisfies a predetermined condition; and
    registering the inputted identification code as an identification code corresponding to the uniquely assigned identification code of the sensor unit when the result satisfies the predetermined condition.

9. The method according to claim 8, wherein the identification code used for the comparison is contained in the sensor signal sent from the sensor unit under a condition that the vehicle is traveling.

10. The method according to claim 9, wherein the registering step further including:
    registering the inputted identification code as a temporarily registered identification code when the result of the comparison satisfies the predetermined condition; and
    registering the temporarily registered identification code as a formally registered identification code when the step of registering the inputted identification code as a temporarily registered identification code is performed for all sensor units.

* * * * *